S. O. BARRON & G. W. FAULKNER.
PRUNING IMPLEMENT.
APPLICATION FILED JULY 7, 1913.
1,108,670.
Patented Aug. 25, 1914.
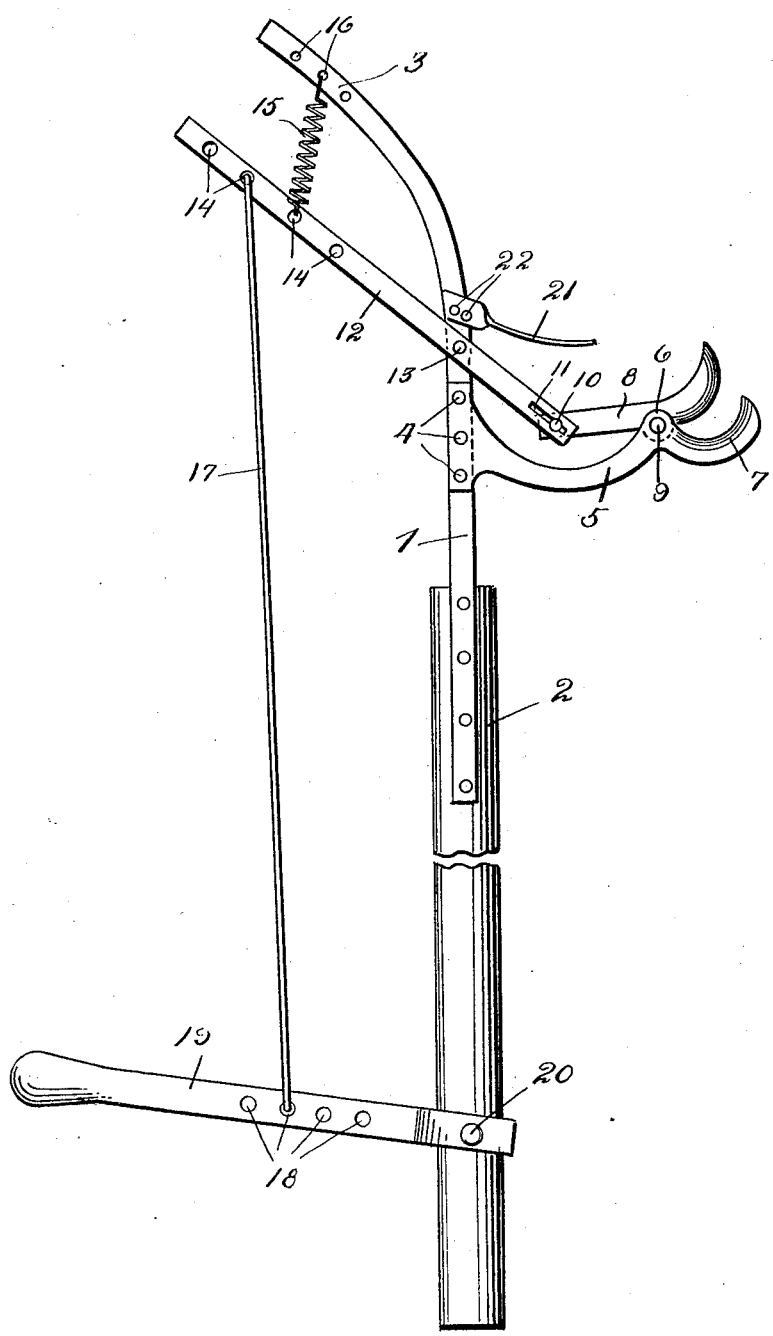
Witnesses
J. Milton Jester
[signature]
Inventors
S. O. Barron
G. W. Faulkner
By Edward R. Whitman
Attorney

UNITED STATES PATENT OFFICE.

SAMFORD O. BARRON AND GEORGE W. FAULKNER, OF BELL, FLORIDA.

PRUNING IMPLEMENT.

1,108,670. Specification of Letters Patent. Patented Aug. 25, 1914.

Application filed July 7, 1913. Serial No. 777,648.

*To all whom it may concern:*

Be it known that we, SAMFORD O. BARRON and GEORGE W. FAULKNER, citizens of the United States, residing at Bell, in the county of Alachua and State of Florida, have invented certain new and useful Improvements in Pruning Implements, of which the following is a specification.

This invention relates to pruning implements and particularly that type employed in cutting twigs and small branches from trees, and has for its object the provision of a novel form of device adapted to cut downwardly upon a branch in order to prevent binding of the blade as the branch bends down.

An important object of the invention is to provide a device of this character which has a powerful leverage to facilitate the cutting of branches and the like, and which is so constructed that it may conveniently and advantageously be employed at a considerable height above the ground.

Another object is to provide a device of this character which is provided with means for serving as a buffer to limit the movement of the blade and absorb the shock caused when the blade passes entirely through a branch or the like.

With these and other objects in view, such as simplicity, cheapness, efficiency, durability, and the general improvement of the art, the invention consists in the novel construction and arrangement of parts, as will be hereinafter described and claimed, and illustrated in the accompanying drawings, in which the figure shows a front elevation of the improved device.

Referring more particularly to the drawings, the numeral 1 designates the main frame or body portion of the improved device, which is bolted, riveted, or otherwise secured upon the handle 2, which may be formed in sections if desired. At its upper end the main or body portion 1 is curved to form a laterally extending portion 3 for a purpose to be described. Riveted or bolted upon the main portion 1, as at 4, is a stationary member 5 provided intermediate its ends with an ear 6 and terminating in a hook shaped blade 7.

A movable blade 8 is pivoted upon the ear 6, as shown at 9, and is provided at its rear portion with a pin or bolt 10, which extends through an elongated slot 11 formed in the shorter end of an operating lever 12, which is pivoted, as at 13, upon the main portion 1. The lever 12 is provided along its rear portion with a plurality of openings 14, within any one of which one terminal of a coil spring 15 may be engaged. The other end of the spring 15 may be engaged within any desired one of a plurality of openings 16 formed adjacent the upper end of the main portion 1. A link or connecting rod or wire 17 engages within one of the openings 14 in the lever 12 and extends downwardly for engagement within any desired one of a plurality of openings 18 formed in an actuating lever 19 pivoted upon the handle 2, as at 20.

The operation of the device is as follows: The parts being in the position indicated in the drawing, the device may be placed in the proper relation to a branch to be cut, with the blades 7 and 8 engaging the bottom and top, respectively, of the limb. Then by pulling down upon the actuating lever 19, the lever 12 will be moved downwardly around its pivot 13, thus elevating the rear end of the blade 8 and causing the free end of the blade 8 to cut downwardly through the branch. The spring 15 will then return the lever 12 and consequently the blade 8 to their original positions. The slot 11 in the end of the lever 12 is provided in order to prevent any binding at the point of connection of the blade 8 with the lever 12. In order to prevent any shock or sudden movement of the blade 8 and lever 12 when a branch has been entirely cut through, a buffer 21 is provided adjacent the lever 12, comprising a strip, preferably of spring metal, bolted or riveted upon the body portion 1, as shown at 22. When the blade 8 has passed entirely through a branch the lower end of the lever 12 will strike against the buffer 21, thus absorbing the shock and preventing danger of breaking the spring 15, or any other part of the device. It will thus be seen that as the branch is cut downwardly, there will be no binding of the movable blade as the branch weakens and bends downwardly. Thus an extremely simple, efficient, and durable pruning device is provided.

It will be readily understood that various changes in the form, construction, and arrangement of parts may be resorted to, without departing from the spirit of the invention or limiting the scope of the subjoined claims.

Having thus described our invention, what we claim is:—

1. A pruning implement comprising a handle, a frame secured upon said handle, an arm rigidly secured to said frame and extending at a substantial right angle laterally therefrom, a blade formed on the free end of said arm, the cutting edge being the upper edge, a movable arm pivotally secured intermediate its ends upon said arm, a blade formed on one end of said movable arm, the cutting edge being the bottom edge, a pin secured upon the other end of said arm, a lever pivoted intermediate its ends transversely of said frame and provided at one end with a slot engaged by said pin, a spring connected with said frame and the other end of said lever, and means for actuating said lever.

2. A pruning implement comprising a handle, a frame secured upon said handle, an arm rigidly secured to said frame and extending at a substantially right angle laterally therefrom, a blade formed on the free end of said arm, the cutting edge being the upper edge, a movable arm pivotally secured intermediate its ends upon said arm, a blade formed on one end of said movable arm, the cutting edge being the bottom edge, a pin secured upon the other end of said arm, a lever pivoted intermediate its ends transversely of said frame and provided at one end with a slot engaged by said pin, a spring connected with said frame and the other end of said lever, an operating lever pivoted upon said handle and adapted to be swung vertically, and a link connected with said operating lever and the free end of said first named lever.

In testimony whereof we affix our signatures in presence of two witnesses.

SAMFORD O. BARRON.
GEORGE W. FAULKNER.

Witnesses:
G. W. MARTIN,
G. C. BUTLER.

---

Copies of this patent may be obtained for five cents each, by addressing the "Commissioner of Patents, Washington, D. C."